April 22, 1969   B. LEUTENEGGER   3,439,944
NIPPLE FOR PIPE JOINTS
Filed April 29, 1966
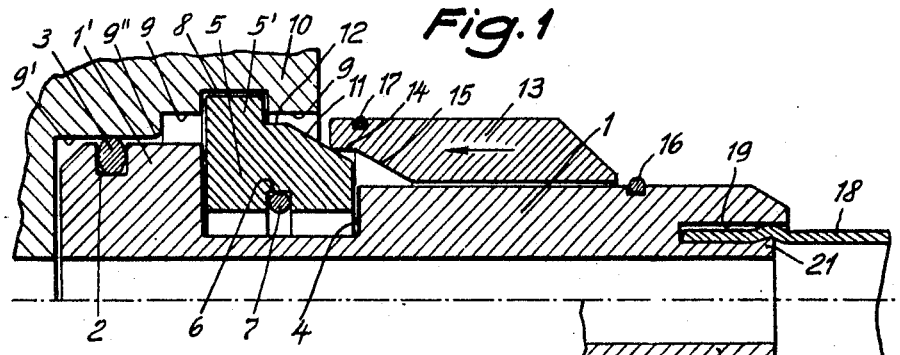
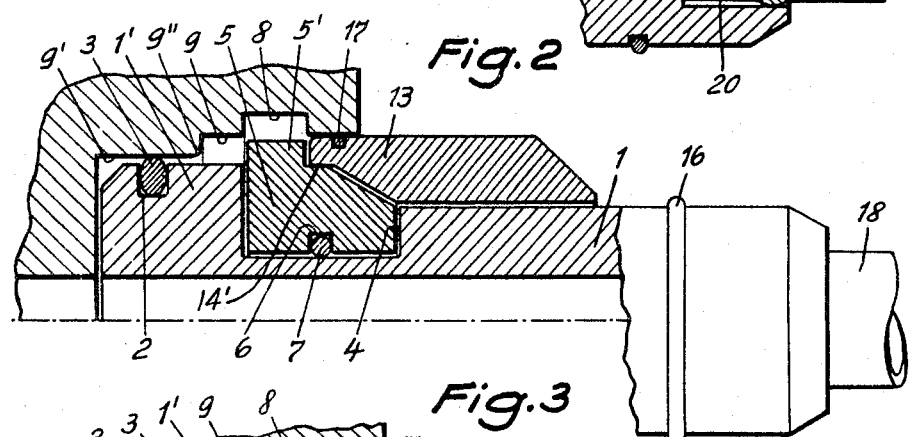
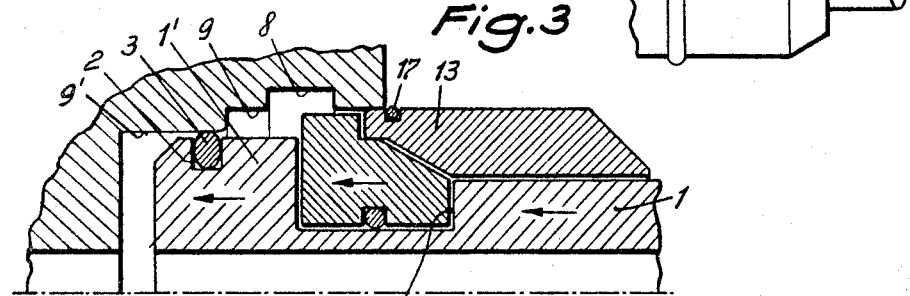
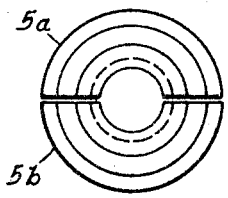
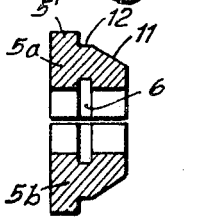
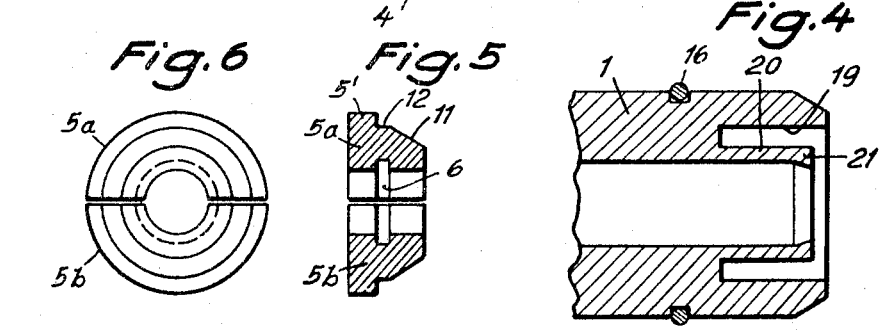
INVENTOR.
BERNHARD LEUTENEGGER
BY Karl F. Ross
Attorney

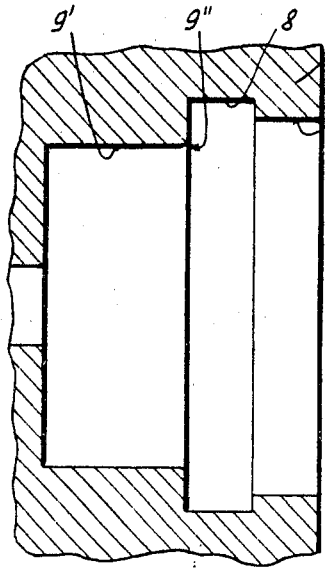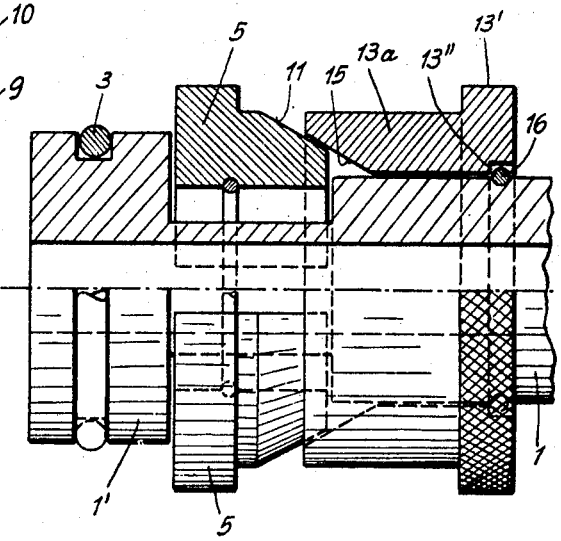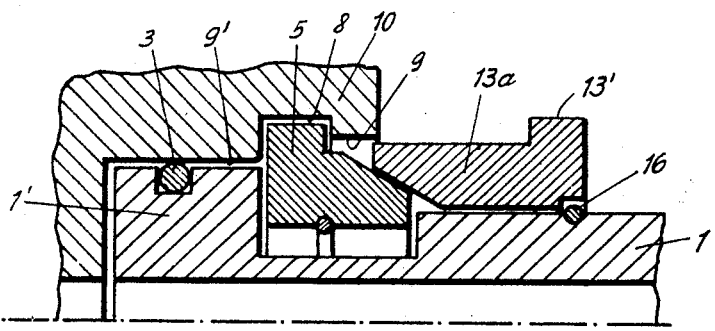

United States Patent Office
3,439,944
Patented Apr. 22, 1969

3,439,944
NIPPLE FOR PIPE JOINTS
Bernhard Leutenegger, 18 Allschwilerstrasse,
4142 Munchenstein, Basel-Land, Switzerland
Filed Apr. 29, 1966, Ser. No. 546,327
Claims priority, application Switzerland, July 16, 1965,
10,183/65; Germany, Oct. 1, 1965, L 51,775
Int. Cl. F16l 25/00
U.S. Cl. 285—321     4 Claims

ABSTRACT OF THE DISCLOSURE

Pipe joint with a nipple fitting into a receiving opening of a female element, the latter being formed with an inner peripheral groove to receive a peripheral flange of a segmented latch member resiliently biased for radial outward displacement on the forward part of the nipple, the latch member being retractable from the groove of the female element by a sleeve which is slidable on the rear part of the tubular nipple shaft and whose front end has a mouth engageable with a tapered rear surface of the latch member upon forward movement of the sleeve toward the receiving opening.

---

Threaded nipples serve as male elements for the connection of flexible pipes leading from or to a point of consumption, these nipples having to be wrapped with sealing material prior to assembly and then screwed into the tapped bore of a female element to form a joint therewith. Under these conditions there is a danger that, upon the threaded nipple being screwed into the female element, parts of the sealing material may become detached and enter the pipe, whence they reach the fluid system served by the joint and may cause disturbances. To overcome this inconvenience, tapered threaded nipples have been recently used, which are intended to seal when tightened. However, with such tapered threaded nipples there is a danger that the thread may be excessively tightened and destroyed. Moreover, as a result of stripping of the thread, metal clips may enter the joint and cause disturbances.

A wrench is needed for tightening both types of nipple. Furthermore, threaded nipples have the inherent drawback that, when inclined at an angle to the joint axis, they cannot be aligned easily without becoming leaky or being stripped. In series assembly the separation must be chosen according to the space required for screwing in the nipple.

My present invention relates to a nipple for pipe joints in which at a point of extraction or consumption, say, a valve or cylinder, constituting the female element of a junction between pipes subjected to high pressures, there is provided a receiving opening or bore for the nipple, the peripheral wall of this bore being provided with an annular groove for engagement by a segmental latching member or bush which is spring-biased into a locking position and guided in an annular outer groove of the tubular nipple at the forward part of its shank, the bush having a peripheral flange fitting into the groove of the receiving opening and, rearwardly of that flange, a tapered camming surface coacting with a release sleeve which is to be longitudinally movable on the rear part of the nipple, said sleeve, when displaced, acting upon the taper and withdrawing the segmental bush from the inner annular groove of the surrounding body against the action of its spring, thus releasing the latch.

As compared with threaded nipples, the nipple according to the invention has the advantage that it need only be pushed into a receiving opening, whereupon the nipple is locked in the connected position by an automatic latching device. The assembly of this threadless joint can be carried out quickly and easily without a tool. When assembled, the nipple may be turned at will and, when angularly oriented, may be set in any desired position.

In the accompanying drawing, which shows by way of example three embodiments of my invention:

FIG. 1 shows a partial axial section through a nipple according to the first embodiment in its connected position;

FIG. 2 is a partial axial section through same nipple in its release position;

FIG. 3 is a partial axial section through the nipple shown partly inserted into its receiving opening, prior to locking;

FIG. 4 shows a longitudinal section of the rear end of the nipple;

FIG. 5 shows an axial section through a segmental bush of the nipple drawn to a reduced scale;

FIG. 6 is an end view of the bush shown in FIG. 5;

FIG. 9 is a sectional view of a modified receiving opening in a valve body forming part of a second embodiment;

FIG. 10 shows a nipple fitting into the opening of FIG. 9; and

FIG. 11 shows the nipple of FIG. 10 introduced into its valve opening.

Figure 7:
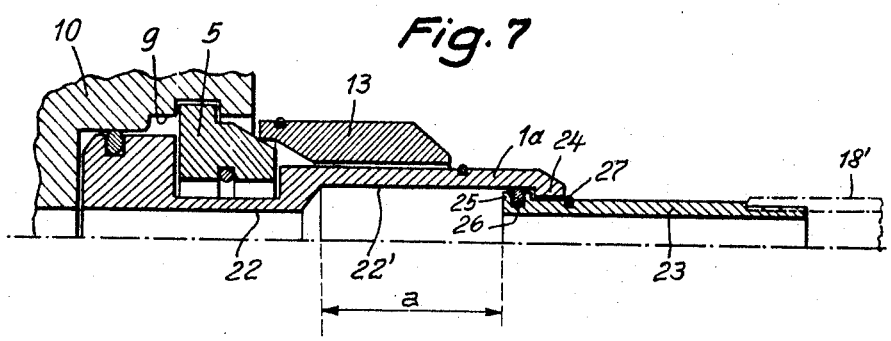
FIG. 7 is a view similar to FIG. 1 of second embodiment, representing a nipple for rigid pipes shown in its connected position.

The connection nipple shown in FIGS. 1–4 includes a tubular shank 1 which has at its front a sealing head 1' with an elastic sealing ring 3 inserted in a circumferential groove 2 thereof. Behind the head 1' the shank 1 has an annular groove 4 in which a locking bush 5 formed of two segments 5a, 5b (FIGS. 5 and 6) is guided in a radially movable manner. Located in an inner groove 6 of the bush is a circlip 7 tending to press the two segments outwards into their locking position. With its front part 5', which is a radial flange of larger diameter, the segment bush engages in the locked position in an annular inner groove 8 of the receiving opening 9 of a valve body 10. The segmental bush 5 has a tapered camming surface 11 with an adjoining cylindrical portion 12. A release sleeve 13, which is movably guided along shank 1, interacts by means of its front end with the segmental bush 5 and has for this purpose a cylindrical bore 14 merging with a forwardly diverging tapered bore 15. The cylindrical bore 14 positively fits the cylindrical portion 12, and the rearwardly converging periphery of its tapered bore 15 fits the tapered surface 11. A stop ring 16 bedded in an annular groove on the rear part of shank 1 serves to limit the return movement of sleeve 13 in a position in which the front end of sleeve 13 lies against the taper 11, thus securing the bush segments 5a, 5b against falling out of the guide groove 4 when the nipple is not in the receiving opening 9. The outer diameter of the release sleeve 13 corresponds to the internal diameter of the connection opening 9. The front end of the release sleeve 13 carries in a circumferential groove a circlip 17 which, when sleeve 13 enters opening 9, generates a certain frictional resistance yieldably opposing introduction of the front end of the sleeve into the open end of bore 9. A stepped portion 9' of this bore arrests the nipple head 1' in a position of alignment of flange 5' with groove 8 and terminates in a rounded shoulder 9" to permit the elastic sealing ring 3 to enter the bore 9' easily. To permit connection of nipple 1 with a flexible plastic pipe 18 leading to a point of consumption, its rear end is provided with a cylindrical recess 19. The inner sleeve 20 formed by this recess has at its mouth an annular bead 21 which narrows the bore and which, after the plastic pipe 18 has been pushed onto said sleeve 20, is pressed from the inside outwardly by forcing in a mandrel, thus clamping the plastic pipe 18 in the recess.

FIG. 3 shows the nipple in a position in which it may be easily withdrawn from the opening 9 or pushed thereinto. When the nipple is pushed into receiving opening 9, the segmental bush is in its compressed position because of the restraining action of sleeve 13 whose cylindrical mouth portion 15 embraces the shoulder 12 thus permitting the nipple to be introduced without difficulty into the valve body 10. From this point onward, with continued movement of the nipple, the release sleeve 13 is pushed off the segmental bush 5, owing to the circlip 17 abutting against the mouth of the receiving opening 9, and is then forced back to the stop ring 16 by the camming action of the tapered face 11 of the bush 5, which expands into its latching position (FIG. 1) on becoming aligned with groove 8. Withdrawal of the nipple is made possible by pushing the release sleeve 13 forward in the direction of the arrow in FIG. 1 and into the position shown in FIG. 2. By this displacement, the segments 5a, 5b are pressed back into the annular groove 4 by the pressure which the inner edge 14' of the sleeve exerts upon the tapered face 11. In this position the nipple can be withdrawn from the opening 9.

Figure 8:
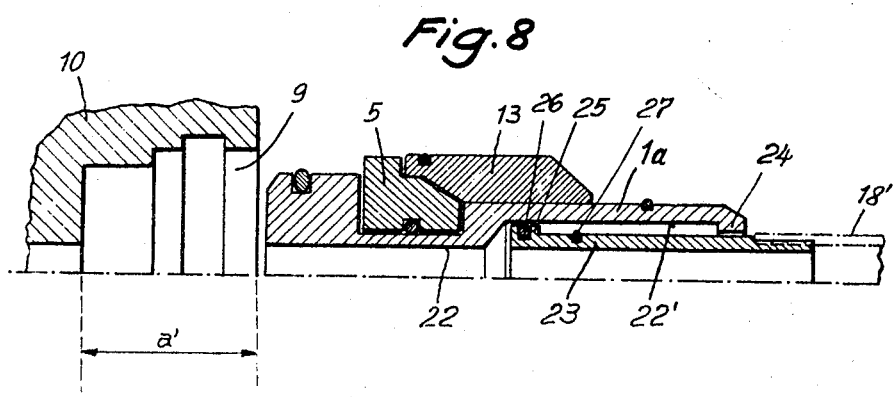
FIG. 8 shows the nipple according to FIG. 7 retracted upon release of its locking device.

The nipple according to FIGS. 7 and 8, designed for rigid pipes, has a shank 1a, provided at its rear end with an enlarged portion 22' of its axial bore 22. At the rear end of shank 1a, the enlarged bore 22' is reduced by an annular inner shoulder 24 and serves for guiding shank 1a on a connecting piece 23 forming an extension of a rigid pipe 18'. The nipple shank 1a can be slid along the connecting piece 23. A collar 25 with inserted sealing ring 26, provided at the forward end of the connecting piece 23, serves for limiting the sliding movement of shank 1a, the length of the enlarged bore 22' being such that the stroke a of the shank on connecting piece 23 is somewhat greater than the depth a' of the opening 9 of the receiving body 10. In this manner the nipple may be easily united with or detached from the body 10.

In the embodiment according to FIGS. 9–11, the receiving bore 9' of the valve body 10 possesses at the transition to the annular groove 8 a rounded edge 9" with a radius of 1 mm. which is meant to prevent the sealing ring 3 from being damaged during introduction of the nipple. The split latching member 5 is of the same design as in the first embodiment. Likewise, the nipple shank 1 together with sealing head 1' is unaltered. On the other hand, in the release sleeve 13a with the tapered bore 15 the cylindrical end portion 14 is omitted. Moreover, the release sleeve 13a is designed without a stripping spring 17, inasmuch as the sleeve is automatically pushed back upon connection of the nipple by the expansion of the locking bush 5 acting through the tapered face 11. This automatic return of the release sleeve 13a takes place if the tangent of the taper angle is greater than the coefficient of friction between segmental bush 5 and release sleeve 13a, in which case no self-locking can take place between these parts. The stop ring 16 is so arranged on the nipple shank 1 as to limit the return path of release sleeve 13a before the sleeve completely clears the valve body 10. Therefore, the end of the release sleeve 13a facing the valve body 10 still projects about 1 mm. into the opening 9 and forms a clean closure, as shown in FIG. 11. In this position of the release sleeve 13a the stop ring 16 lies covered in an enlarged recess 13" in the axial bore of sleeve 13. Further, the release sleeve 13a is provided at its end turned away from valve body 10 with a collar 13' of larger diameter which is knurled on its peripheral surface so as to provide a grip on the sleeve.

What I claim is:
1. In a pipe joint, in combination:
a female element having a bore open at one end, the peripheral wall of said bore being formed with an annular groove adjacent said end;
a male element comprising a tubular shank with a front part insertable into said bore through the open end thereof;
a split latching member mounted in said front part in an axially fixed position, said latching member being resiliently biased in a radially outward direction and being provided with a peripheral flange receivable in said groove for axially locking said elements in an aligned connecting position, said latching member further having a tapered camming surface rearwardly of said flange extending within the open end of said bore upon said elements occupying said connecting position; and
a sleeve axially slidable on the rear part of said shank, said sleeve having a front end receivable in said open end for camming engagement of an inner edge of said sleeve with said tapered surface to withdraw said flange from said groove, said inner edge of said sleeve surrounding said shank with clearance, said sleeve having a rearwardly converging inner periphery beyond said edge with a taper substantially corresponding to that of said camming surface, said sleeve having an inner cylindrical surface adjoining said converging periphery, said latching member having an outer cylindrical surface embraceable by said inner surface in a radially inwardly retracted position of said latching member, said sleeve being provided with external abutment means engageable by said female element upon insertion of said shank into said bore to permit entrance of said flange into said groove, said abutment means being yieldable to increased forward pressure upon said sleeve for enabling release of said flange from said groove.

2. The combination defined in claim 1 wherein said bore has a stepped portion beyond said groove, said shank terminating in a head engaging said shoulder in said connecting position for positively aligning said flange with said groove.

3. The combination defined in claim 1 wherein the front end of said sleeve has an outer edge fitting into said open end of said bore, said abutment means comprising a sealing ring encircling said outer edge.

4. The combination defined in claim 1 wherein said latching member is a bush divided into a plurality of complementary segments, said shank being provided with stop means so limiting the rearward motion of said sleeve as to maintain said inner edge in register with said camming surface, thereby preventing detachment of said segments from said shank.

References Cited

UNITED STATES PATENTS

| 2,478,976 | 8/1949 | Modlin | 285—302 X |
| 2,521,701 | 9/1950 | Earle | 285—316 X |
| 3,001,673 | 9/1961 | Brown | 285—385.2 X |
| 1,587,079 | 1/1926 | Machino | 285—104 |

FOREIGN PATENTS

| 692,526 | 8/1964 | Canada. |
| 1,407,875 | 6/1965 | France. |

EDWARD C. ALLEN, Primary Examiner.

WAYNE L. SHEDD, Assistant Examiner.

U.S. Cl. X.R.

285—399; 287—119